United States Patent [19]

Raychaudhuri

[11] Patent Number: 5,055,331
[45] Date of Patent: Oct. 8, 1991

[54] PHASE-CHANGE OPTICAL RECORDING MEDIA

[75] Inventor: Pranab K. Raychaudhuri, Rochester, N.Y.

[73] Assignee: Eastman Kodak Company, Rochester, N.Y.

[21] Appl. No.: 546,979

[22] Filed: Jul. 2, 1990

[51] Int. Cl.$^5$ ............................................... B32B 3/02
[52] U.S. Cl. ........................................ 428/64; 428/65; 428/411.1; 428/457; 428/913; 428/76; 346/766; 346/135.1; 369/288; 430/945
[58] Field of Search .................... 428/64, 65, 76, 457, 428/411.1, 913; 346/766, 135.1; 369/288; 430/945

[56] References Cited

U.S. PATENT DOCUMENTS 4,670,345 6/1987 Morimoto et al. ............... 428/411.1
4,710,452 12/1987 Raychaudhuri .................... 430/495

FOREIGN PATENT DOCUMENTS 61-258787 11/1986 Japan .
1-245440 9/1989 Japan .

OTHER PUBLICATIONS

Chen et al.,; 10/85; "New Ideas for Phase Change Media—Achieving Sub-Microsecond Erase Woth Data Stability".
Rubin et al.; 10/85; "Systematic Phase Transformation Kinetics Measurements—Crystallization and Critical Quench Rates of the Binary Te-Ge System".

Primary Examiner—Patrick J. Ryan
Attorney, Agent, or Firm—Doreen M. Wells

[57] ABSTRACT

A recording element comprising, as the optical recording layer, an amorphous thin film of an alloy having the formula:

$$(Ge_xTe_{1-x})_{1-z}Mn_z$$

wherein, on an atom-to-atom basis,
x is from 0.3 to 0.7, and
z is greater than zero up to 0.4 is disclosed.

4 Claims, No Drawings

PHASE-CHANGE OPTICAL RECORDING MEDIA

FIELD OF THE INVENTION

This invention relates to optical recording elements.

BACKGROUND OF THE INVENTION

It is known that certain materials, which exist in a stable condition at room temperature, in either a substantially amorphous or substantially crystalline state can be converted from one of these states to the other by supplying sufficient energy to heat the material and then allowing it to cool under controlled conditions to a crystalline or an amorphous state.

It is also known that such materials may be used for storing and retrieving information. These materials may be used in the form of thin films for optical recordings. The thin films are written upon by selectively changing particular areas of the thin film from one state to the other (from amorphous to crystalline or crystalline to amorphous). Such change may be accomplished by providing a low amplitude energy pulse of sufficient duration to heat the material above its transition temperature. On the other hand to convert the material from a crystalline to an amorphous state, rapid cooling is essential. This change, may be accomplished by pulsing the material with a high energy pulse source to raise the material to the melt temperature after which there must be a rapid drop in temperature freezing the material in the amorphous state before crystallization can occur.

Optical recording elements comprising thin films of GeTe alloys are known for use as optical recording layers. One such optical element is disclosed in papers entitled "New Ideas for Phase-Change Media Reversible Media—Achieving Sub-Microsecond Erase with Data Stability", Chen et al and "Systematic Phase Transformation Kinetics Measurements—Crystallization and Critical Quench Rates of the Binary Te-Ge System", Rubin et al. Both of the latter papers were presented at the Topical Meeting on Optical Data Storage, IEEE, and OSA in Washington, D.C. on Oct. 15-17, 1985.

In these papers, Ge-Te thin films are used for erasable recordings. In erasable recording the films have to be crystallized first using a long duration laser beam to form the "erased" condition. Data is then written on the film as localized amorphous spots using a high intensity short duration focused laser beam to raise the film above its liquidus temperature. The film is then quenched thereby forming the amorphous or written condition. Subsequent erasure of the data is done again by laser crystallization which is usually a slow process resulting in excessively long erasure time for many applications. The essence of these reports is that by using a stoichiometric GeTe composition, the crystallization rate can be significantly improved to allow laser pulse lengths as low as 250 nanoseconds for crystallization.

The problem is that such films cannot be used in write-once optical recording elements in which the written information is encoded in the crystallized state. The slow crystallization rate from the initial amorphous state makes the writing process prohibitively slow for most applications.

In U.S. Pat. No. 4,710,452, there is described an optical recording element comprising a thin film of a Ge-Te-Ti alloy. The incorporation of Ti yielded improved performance over the above-described Ge-Te thin films in terms of a higher rate of crystallization from the amorphous state, high recording sensitivity and high carrier-to-noise ratios (CNR). An improved recording medium containing Ge-Te-Sb is also disclosed in U.S. Pat. No. 4,670,345 as having excellent thermal stability, sensitivity and signal-to-noise ratio.

The problem is that although the above patented ternary compounds exhibit improved performance, the prior art gives no guidance that would lead to the selection of particular metals which would be operable for this purpose. Further, there appears to be no general rule which a skilled worker in the art may follow to arrive at the operable metals. For example, it has been demonstrated that optical recording elements made of Ge-Te-Cr alloy exhibit no significant improvement over the Ge-Te alloy even though Cr is near Ti on the periodic table of elements. Also, even after the skilled worker discovers which metals are useful for the invention, it is further necessary to ascertain the composition which gives the desired improvement.

Thus, the problem to be solved is to provide alternative ternary alloys having performance similar to Ge-Te-Ti.

SUMMARY OF THE INVENTION

The present invention provides an optical recording element comprising an amorphous thin film of an alloy having the formula:

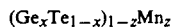

$$(Ge_xTe_{1-x})_{1-z}Mn_z$$

wherein, on an atom-to-atom basis,
X is from 0.3 to 0.7, and
Z is greater than zero up to 0.4.

The optical recording elements of this invention possess a much improved crystallization rate compared to the above described Ge-Te elements. With the elements of this invention, crystallization is obtained using pulse lengths of 100 nanoseconds or less. The improved crystallization rate permits the use of the elements of this invention for high rate write-once recording using laser crystallization as the recorded state. Moreover, such elements exhibit high recording sensitivity and high carrier-to-noise ratios.

In a preferred embodiment the optical recording elements of the present invention comprise an amorphous thin film of an alloy having the formula:

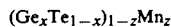

$$(Ge_xTe_{1-x})_{1-z}Mn_z$$

wherein, on an atom-to-atom basis,
X is from 0.4 to 0.6, and
Z is from 0.10 to 0.25.

The elements of this invention differ from the prior art in that Mn is incorporated in the Ge-Te thin films. The Ge-Te-Mn films have markedly enhanced speed and sensitivity over the Ge-Te composition for laser crystallization in the near infrared region. That is, they generally require less laser writing power and laser pulse length than the Ge-Te films used in the prior art elements. The elements of this invention also are less susceptable to heat-induced deformation and thus exhibit less writing noise than Ge-Te thin films without Mn.

Thus, these Ge-Te-Mn alloys are similar in performance to the Ge-Te-Ti compositions. This was surprising since substitution of Cr for Ti did not produce the desired results although Cr is near Ti on the periodic table of elements.

DETAILED DESCRIPTION OF THE PREFERRED EMBODIMENT

The thin amorphous film recording layers can be prepared by conventional thin film deposition techniques such as evaporation, RF (radio frequency) and DC (direct current) sputtering from an alloy target, and RF and DC co-sputtering from targets of the individual elements. Enhancement of sputtering processes by applying magnetic fields (magnetron sputtering) can also be used. The thickness of the films can be from a few tens (10) to a few hundred nanometers (500 nm) depending on compromises among factors such as contrast, sensitivity, production rate, material cost, ease of control, data rate, etc.

The amorphous thin film optical recording layers of this invention are written upon with a coherent beam of electromagnetic radiation of sufficient energy to convert selected portions of the amorphous film 42 to a crystalline state. In the present invention the amorphous thin film optical recording layers are of sufficient sensitivity that laser powers of about 2.5 to 10 mW at laser pulsewidth of 50 to 100 nanoseconds provide sufficient energy to make the conversion.

Preliminary investigations of the amorphous thin film were made with a static pit tester.

The static pit tester provides automated facilities for exposing standard test patterns on two-inch by three-inch glass slides of film samples with a laser. A microcomputer was used to control the sample position and the laser power. Each recording layer is exposed in the static pit tester to a power series array of 10 marks of 4 micron centers at each of six power levels (4, 5, 6, 8, 10 and 12 mW) on the sample, with a 50 to 5,000 nanoseconds pulse duration from a 830 nanometer diode laser.

The suitability of the material for optical recording is determined by comparing the reflectivity of the exposed areas of the slide against the background of the unexposed areas, i.e. the difference in reflectivity between the amorphous and the crystalline areas. This difference was visualized under an optical microscope at 1000X for all tests described herein.

This reflection change is expressed as recording contrast, CT, by the following definition:

$$CT = \frac{R_c - R_a}{R_c + R_a} \times 100\%$$

wherein $R_c$ and $R_a$ are the reflectances of the crystalline and the amorphous states respectively. A minimum contrast of 5% must be achieved for the films to be considered useful as optical recording layers.

This invention may be practiced with thin Ge-Te films in which Mn or a compound of Mn is incorporated. The film may be deposited on a variety of substrates.

Substrates which can be used include plastic films, such as polyethylene terephthalate, polymethyl methacrylate, and polycarbonate, a glass plate, paper and metallic plates.

An overcoat layer is preferably applied over the alloy layer for added benefits, for example, to reduce noise that results from the recording process. Common overcoat materials are polymer coatings such as those described in U.S. Pat. No. 4,340,655 issued July 20, 1982 to Hollister et al and dielectric coatings such as $SiO_x$, ZnS and $Al_2O_3$. A commercially available acrylic spray paint such as clear Krylon ® can also be used.

The layers of the disc may have various types of configuration. For example, a metallic substrate such as aluminum can be provided with a recording layer comprising an alloy of the invention on both sides of the substrate. A useful disk is thus, aluminum coated on both sides with a smoothing layer, a layer of the phase change alloy of the invention and a layer of a clear protective overcoat. In a similar embodiment, the alloy is provided on a clear substrate which is then adhered to both sides of the substrate with an adhesive. In yet another embodiment, the alloy as described is provided on a transparent substrate to form the recording layer. The optical recording layer is then adhered to the recording layer of an identical recording material with an adhesive layer. The thickness of the adhesive layer provides for the optical separation of the two recording layers.

A useful recording material comprises, starting from the outside surface of the recording material, an overcoat layer, a thin film optical recording layer as described and a substrate. In response to a drive signal, the intensity of a diode recording beam focused on the recording layer is modulated in accordance with information to be recorded.

During recording, the recording material is spun at a constant rate, e.g., 1800 rotations per minute (rpm). As a result, a track of information is recorded on the optical recording layer in the form of selected crystallized areas. As recording continues, the recording spot is caused to scan radially inward across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The optical path of a readout laser beam is focused to a playback spot on the recording material by a high numerical aperture lens. The recording material is of the reflective type so that the radiation forming the playback spot is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

The practice of the invention can be best described by the following examples:

EXAMPLE 1

Control

A thin film of germanium-tellurium was prepared by vacuum evaporation from a boat containing GeTe as the source. The film was about 0.2 μm (2000A) in thickness and had a composition on an atom-to-atom basis of 45% germanium and 55% tellurium ($Ge_{0.45}Te_{0.55}$). Using a static tester equipped with a focused diode laser of wavelength 830 nm, recording marks (crystallized portions of film) were barely visible when made with a laser power of 8 mW or lower at a pulse length of 50 ns. Recorded marks showed mechanical deformation. The deformation was particularly noticeable in marks made at the longer pulse length of 1 μs or at high power levels. Dynamic testing of the disk gave a CNR value of 45 dB (30 K Hz bandwidth) at a recording power of 4 mW.

Invention

A thin Ge-Te film, doped with manganese, was made using the vacuum evaporation procedure described for the control. The resulting film was about 0.2 μm thick and had a composition of 38% germanium, 46.5 tellurium, and 15.5% manganese $(Ge_{0.45}Te_{0.55})_{0.85}Mn_{0.15}$. Again, using the focused diode laser with 0.050 μs (50 ns) pulse length, good marks were made with laser power of less than 4 mW. At the longer pulse length of 1 μs, marks were made with significantly reduced deformation than those of the control. When the disk was tested as described above, a much improved CNR value of 62 dB (30 K Hz bandwidth) was obtained at a recording power of 4 mW.

The difference between the CNR value of the control (45 dB) and that of the invention (62 dB) is highly significant since a difference of 6 dB indicates an improvement of 100%. Even higher CNR values may be obtained by adjusting the composition of the Ge-Te-Mn thin film. At the same time the operational range of the optical disc would be further extended.

COMPARATIVE EXAMPLE

A thin germanium-tellurium film doped with chromium was made by the co-evaporation technique described earlier. The resulting film had a composition of 39% germanium, 47% tellurium and 14% chromium $((Ge_{0.45}Te_{0.55})_{0.86}Cr_{14})$. The film was tested using the static tester in the manner described above. The area exposed by the focused diode laser with 0.050 μs (50 ns) pulse length at 4, 5, 6 and 8 mW were not distinguishable from the unexposed area, i.e. the film of the Ge-Ti-Cr alloy performed no better than the Ge-Te control. At longer pulse length or at higher power, the marks were made with significantly reduced contrast than those of the manganese doped film of the invention example.

This example shows, unexpectedly, that while Mn is an appropriate metal for the purposes of this invention, Cr, its nearest neighbor on the periodic table of elements, is not.

The invention has been described in detail with particular reference to preferred embodiments thereof, but it will be understood that variations and modifications can be effected within the spirit and scope of the invention.

What is claimed is:

1. A recording element comprising, as the optical recording layer, an amorphous thin film of an alloy having the formula:

$$(Ge_xTe_{1-x})_{1-z}Mn_z$$

wherein, on an atom-to-atom basis,
x is from 0.3 to 0.7, and
z is greater than zero up to 0.4.

2. The element of claim 1, wherein x is from 0.4 to 0.6, and z is from 0.05 to 0.30.

3. The element of claim 1, wherein x is from 0.4 to 0.6, and z is from 0.10 to 0.25.

4. An optical recording element according to claim 1 further comprising an overcoat layer.

* * * * *